J. KERSHAW.
APPARATUS FOR TREATING WOOL, SLUBBING, YARNS, AND OTHER FIBROUS MATERIAL.
APPLICATION FILED JAN. 5, 1921.
1,405,038.
Patented Jan. 31, 1922.
4 SHEETS—SHEET 1.
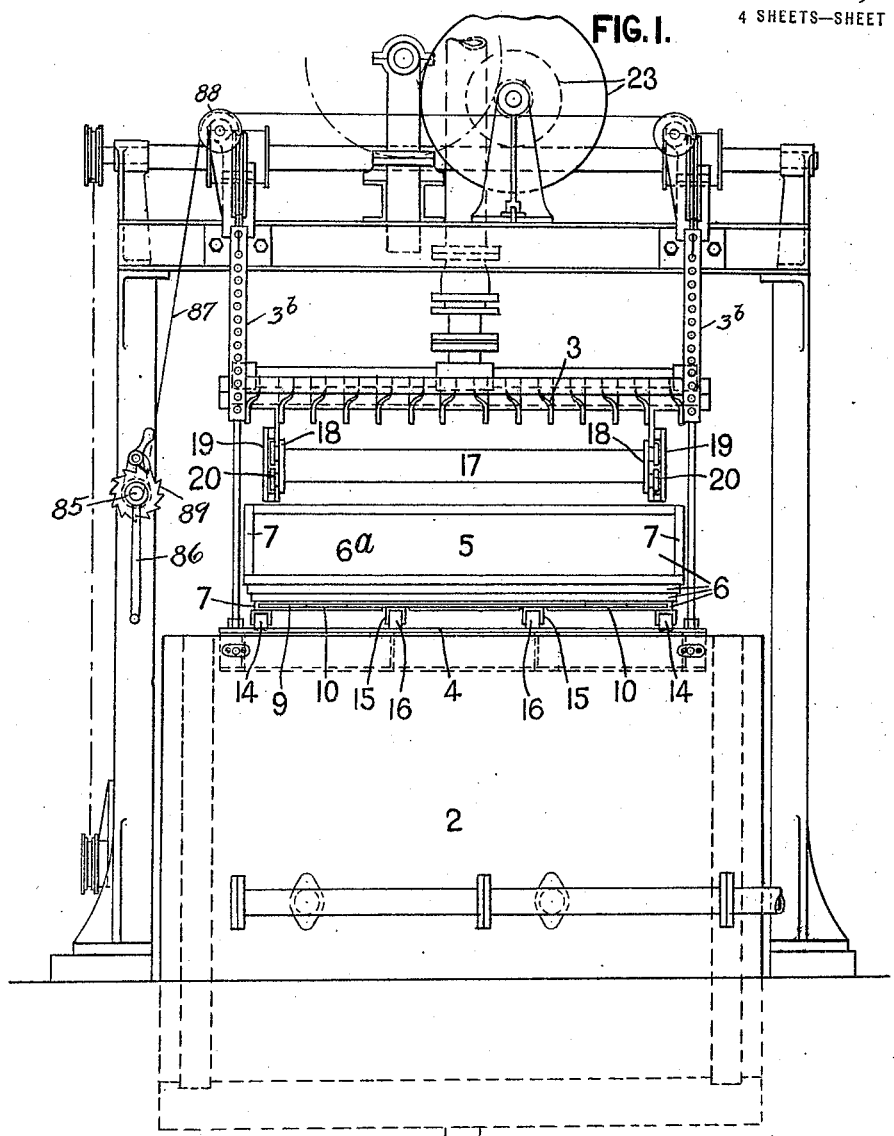
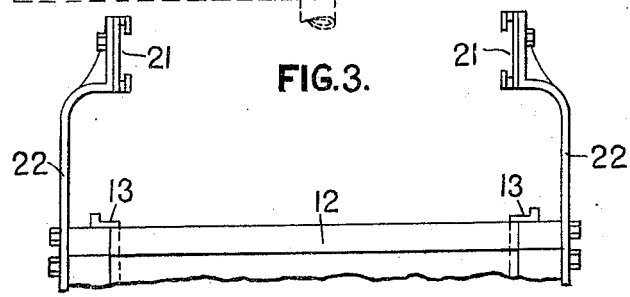

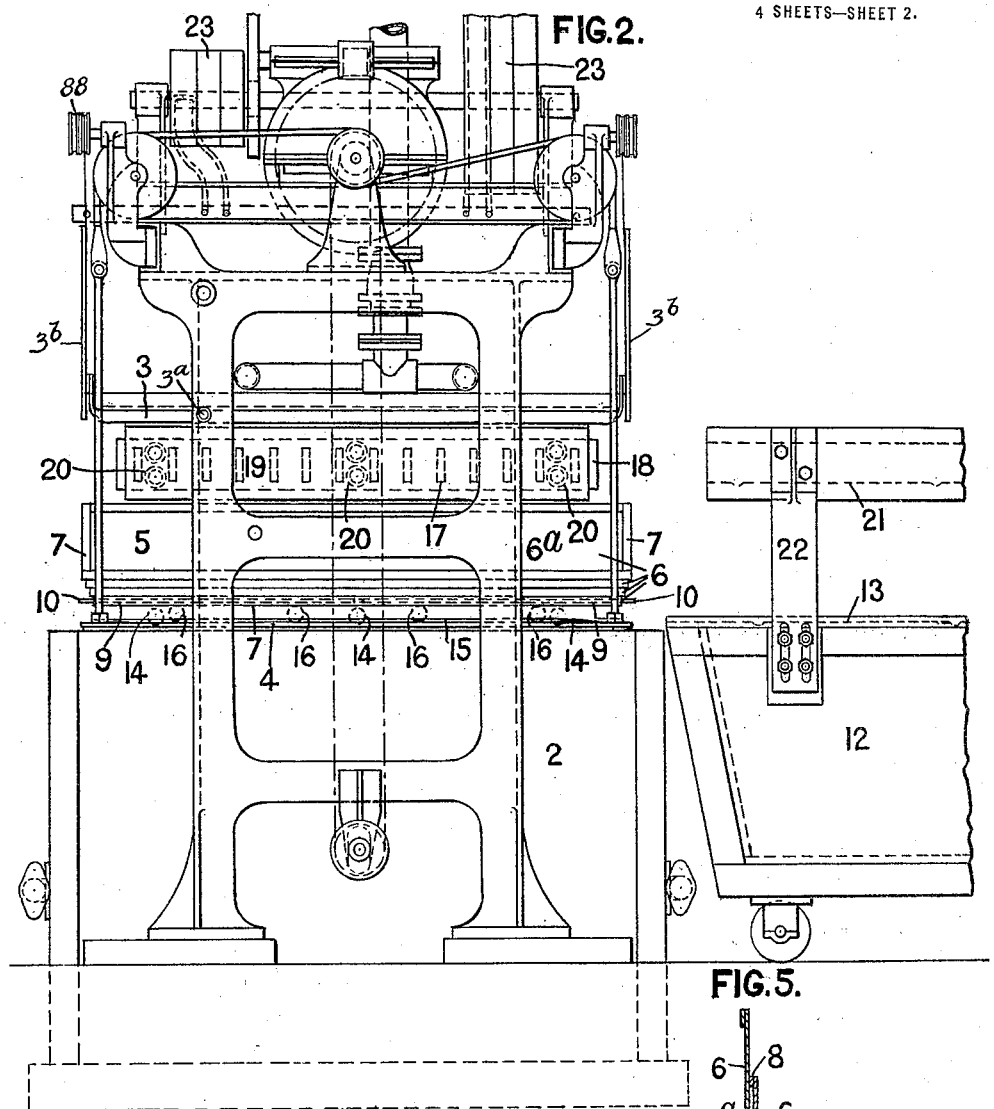

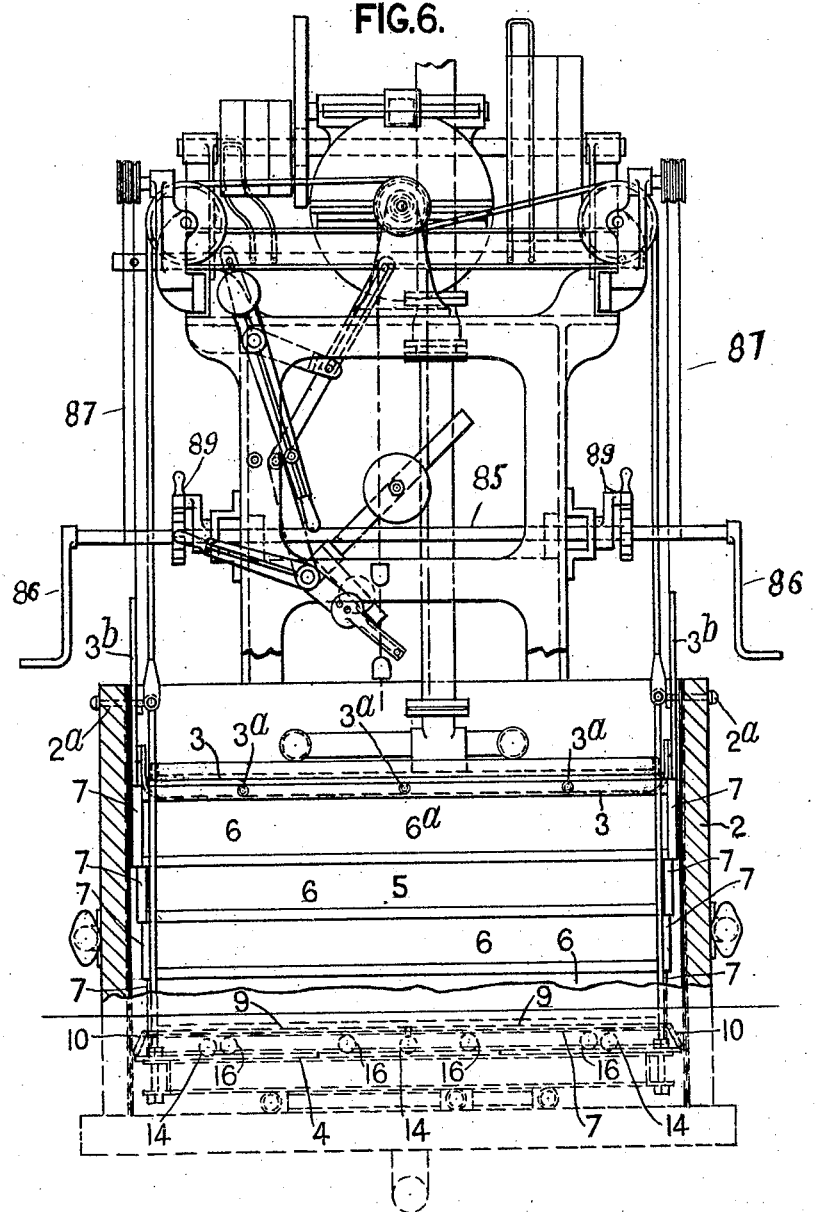

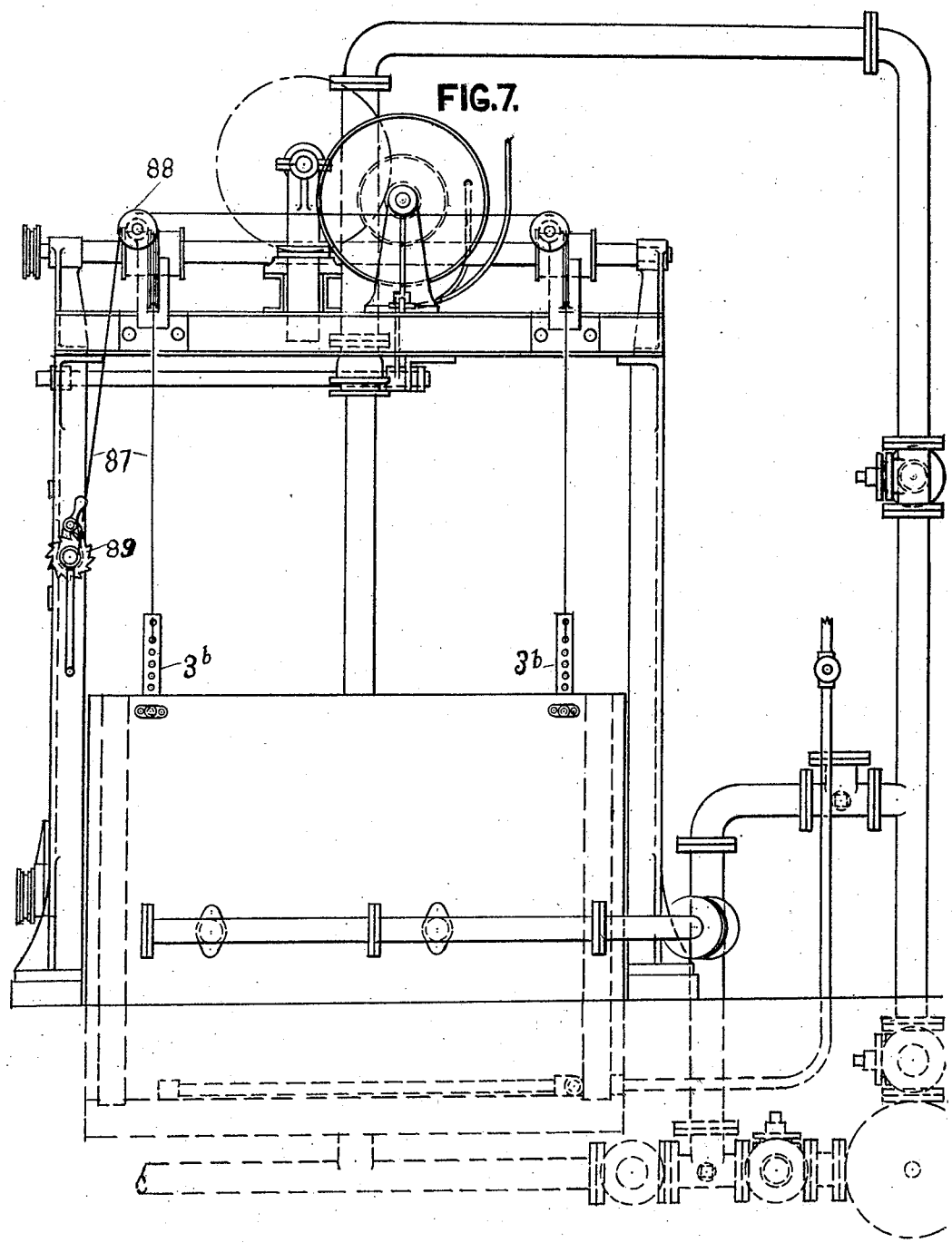

UNITED STATES PATENT OFFICE.

JOE KERSHAW, OF MENSTON, ENGLAND.

APPARATUS FOR TREATING WOOL, SLUBBING, YARNS, AND OTHER FIBROUS MATERIAL.

1,405,038.  Specification of Letters Patent.  Patented Jan. 31, 1922.

Application filed January 5, 1921. Serial No. 435,242.

*To all whom it may concern:*

Be it known that I, JOE KERSHAW, a subject of the King of Great Britain, residing at Rose Mount, Menston, in the county of York, England, have invented new and useful Improvements in Apparatus for Treating Wool, Slubbing, Yarns, and other Fibrous Material, of which the following is a specification.

This invention relates to machines or apparatus for dyeing, mordanting, bleaching, scouring or similarly treating with liquors or liquids wool, slubbing, yarn, wool and cotton wastes, woollen and cotton warps, hose, rags, jute and all raw materials in which the material during treatment is placed in a tank or vat between a vertically reciprocating perforated or the like false bottom and a stationary lattice or the like top and is repeatedly squeezed or compressed when saturated with the liquor or liquid and allowed to open out or expand after each compression and it relates particularly to the machine or apparatus described and illustrated in the specification of British Letters Patent No. 122,227, in which the lift of the false bottom can be varied to suit the bulk or weight of material under treatment, and the object of the present invention is to facilitate and expedite the handling of the material under treatment.

In accordance with this invention the tank or vat is provided with a perforated or the like inner cage to receive the material under treatment. The cage which is open at the top is divided horizontally into two or more sections fitting each other telescopically and when in its working state rests on the false bottom with the top section connected by suitable means to the stationary lattice or the like top. The bottom of the cage is provided with a door or doors to allow for the removal of the treated material contained therein.

When the material under treatment is in hank form it is preferably carried on the usual sticks supported in end plates which are slideably mounted in suitable guides secured to the lattice or the like top so that the end plates and the sticks with the material can readily be removed. Also when the material is in hank form it is found advantageous to impart to the false bottom a quick up-stroke or lift and a slow down-stroke or fall with or without a dwell at the bottom of its stroke and this is accomplished by altering the diameters of the two sets of fast-and-loose pulleys or the diameters of the pulleys driving same, or by altering the diameters of both, or in any other convenient way.

The cage or the end plates carrying the treated material is transferred from the machine or apparatus to an open box like truck provided with suitable guides to receive the cage or the end plates. The contact between the cage and both the false bottom and the guides on the truck and also the end plates and both sets of guides on the machine or apparatus and the truck are preferably made by means of runners or anti-friction rollers in order that the cage in its telescoped or collapsed state or the end plates can readily be transferred to the truck.

In the accompanying drawings, forming a part of this specification, similar figures of reference indicate corresponding parts in each view.

Figure 1 is a front or side elevation of such parts of the dyeing or the like machine or apparatus, fully described and illustrated in the above mentioned specification, as are necessary to illustrate my invention, showing the lattice or the like top and the perforated or the like false bottom in their raised positions with the perforated or the like inner cage in its telescoped or collapsed state resting on the false bottom and the end plates, for supporting the usual sticks carrying the material when in hank form, slideably mounted in guides secured to the lattice or the like top.

Figure 2 is an end elevation of same showing also the truck, provided with guides, in position for receiving the cage in its telescoped or collapsed state and also for receiving the end plates.

Figure 3 is a separate elevation of the truck at right angles to that shown in Figure 2 showing only the top portion of same.

Figure 4 is a plan view, on a larger scale, of a corner portion of the cage and Figure 5 is a vertical section of one of its sides showing the cage in its partly extended state.

Fig. 6 is an end view similar to Fig. 2, but with the bottom part of the front end frame broken away and the upper part of the tank or vat shown in section, and showing the parts in the operative position; and Fig. 7 is a view taken at right-angles to Fig. 6.

Referring to the drawings, 2 designates the tank or vat, 3 the lattice or the like top and 4 the perforated or the like false bottom. 5 is the inner cage divided horizontally into sections 6 fitting each other and connected together telescopically with the top section 6ª preferably on the outside. The top section 6ª is connected to the lattice top 3 by means of pins 3ª engaging holes in said top section, and the lattice or other top 3 is fixed within the top of the tank or vat by pins 2ª engaging holes in the sides of the tank or vat, and a horizontal set of holes in the vertical strips 3ᵇ. The lattice top is adapted to be raised and lowered by means of a cross shaft 85 journaled in bearings in the side frame or brackets secured thereto. The shaft is rotated by means of two crank handles 86, one at each end thereof. A flexible chain or wire rope 87 is connected to each of the metal strips or rods 3ᵇ secured to and supporting the lattice top, said chain passing over a guide pulley 88 pivoted to a fixed bracket on the side beam, the chain being connected at its opposite end to the cross shaft 85 or a drum secured thereon. The lattice top is prevented from descending when in a raised position by means of a ratchet and pawl arrangement 89. The cage rests on the false bottom 4 and when in its working state the top section 6ª is connected by means of pegs or other suitable means to the lattice or the like top 3 which is fixed within the top of the tank or vat 2. In operation the cage and the material contained therein are compressed against the stationary lattice or the like top during the slow up-stroke or lift of the false bottom and both the cage and the material contained therein are allowed to open out during the quick down-stroke of the false bottom and the material is further allowed to open out or expand during the dwell of the false bottom at the bottom of its stroke. The cage, in a preferred construction as shown in the drawings, is composed of perforated sheet metal, copper or galvanized iron, connected together in sections 6 by means of strips 7 of angle iron and countersunk head rivets and the sections are limited in their sliding movement by means of beadings 3 at the top and the bottom of each section as shown in Figure 5. The perforated bottom of the cage is made in two halves or doors 9 slideably mounted and provided with handles 10 at their outer ends to facilitate the drawing apart of the doors so that the treated material may fall out of the cage into a convenient receptacle such as the open box like truck 12. The cage is supported on the false bottom and on suitable rail guides 13 provided over the top of the truck by means of runners or anti-friction rollers 14 in order that the cage can readily be run off the false bottom on to the said rail guides, or vice versa. The said runners or anti-friction rollers as shown are mounted in the bottom of the cage at opposite sides of same and the doors 9 are provided with strengthening pieces 15 provided also with anti-friction rollers 16 which are in contact with the false bottom 4 so that there is less liability of the bottom of the cage bulging out when the material is under compression. Instead of providing runners or anti-friction rollers in the bottom of the cage they may be provided in the false bottom in which case runners or anti-friction rollers are also provided in the rail guides 13. The two doors 9 instead of being slideably mounted in the bottom of the cage may be hinged at the outer ends and kept closed by means of a catch at the inner or meeting ends or by any other suitable device.

When the material under treatment is in hank form it is preferably carried on the usual sticks 17 supported at the ends in slots in the end plates 18 which are slideably mounted in guides 19 detachably secured to the lattice or the like top 3. The said end plates are supported in the guides 19 on anti-friction rollers 20 in order that the end plates, sticks and material can readily be removed and transferred to similar guides 21 located above the top of the truck 13 and secured thereto by the brackets 22 detachably secured to the truck so that they may be removed when not required. In the treatment of material in hank form it is found to be advantageous to impart to the false bottom a quick up-stroke or lift and a slow down-stroke or fall with or without a dwell at the bottom of its stroke and to this end the speeds of the two sets of fast-and-loose pulleys 23 are reversed by either altering the diameters of same, or altering the diameters of the pulleys driving same, or altering the diameters of both, or in any other suitable way.

Claims:—

1. In a dyeing and the like machine, the combination with a vertically reciprocating false bottom and a stationary lattice top, of a perforated inner cage, adapted to contain the material during treatment, said cage being divided horizontally into a plurality of sections fitting each other telescopically, with the bottom section resting on the false bottom and the top section detachably secured to the lattice top, substantially as described.

2. In a dyeing and the like machine, a telescopic perforated cage provided with a door in the bottom of same for removing the treated material contained therein and supported on runners to facilitate the removal of the cage from the false bottom on to guides provided on an open box like truck, substantially as described.

3. In a dyeing and the like machine, a lattice top, yarn stick supporting end plates slideably mounted in guides secured to said lattice top and supported in said guides by means of anti-friction rollers to facilitate the removal of the plates from the guides into similar guides located over an open box like truck, substantially as described.

In testimony whereof I have signed my name to this specification.

JOE KERSHAW.